United States Patent
Liu

(10) Patent No.: US 6,259,239 B1
(45) Date of Patent: Jul. 10, 2001

(54) CIRCUIT AND METHOD FOR CONDITIONING AN AVERAGE AC SIGNAL FOR USE WITH A CONTROLLER ADAPTED TO RECEIVE PEAK INPUT SIGNALS

(75) Inventor: Rui Liu, Plano, TX (US)

(73) Assignee: Tyco Electronics Logistics AG, Steinach/SG (CH)

(*) Notice: Subject to any disclaimer, the term of this patent is extended or adjusted under 35 U.S.C. 154(b) by 0 days.

(21) Appl. No.: 09/510,823

(22) Filed: Feb. 23, 2000

(51) Int. Cl.[7] ............................................. G05F 5/00

(52) U.S. Cl. ............................................. 323/303

(58) Field of Search ................................... 323/282, 283, 323/299, 303; 363/39, 41

(56) References Cited

U.S. PATENT DOCUMENTS

| | | | |
|---|---|---|---|
| 3,667,057 | * | 5/1972 | Pfersch, Jr. et al. ............... 328/156 |
| 4,721,865 | * | 1/1988 | Tallaron et al. ................... 307/350 |
| 4,736,163 | * | 4/1988 | Berkhout et al. .................. 328/162 |
| 5,381,052 | * | 1/1995 | Kolte ................................... 327/60 |

* cited by examiner

Primary Examiner—Matthew Nguyen

(57) ABSTRACT

A conditioning circuit and a method of conditioning an average input signal for use with a controller adapted to receive a signal representing a peak input signal. In one embodiment, the conditioning circuit includes: (1) a comparator circuit that compares an average input signal to a reference signal and develops therefrom a comparison signal representing the average input signal, and (2) a switching circuit, coupled to the comparator circuit, that transforms the comparison signal into a format employable by the controller.

21 Claims, 2 Drawing Sheets

CIRCUIT AND METHOD FOR CONDITIONING AN AVERAGE AC SIGNAL FOR USE WITH A CONTROLLER ADAPTED TO RECEIVE PEAK INPUT SIGNALS

TECHNICAL FIELD OF THE INVENTION

The present invention is directed, in general, to power electronics and, more specifically, to a circuit for conditioning an average AC signal for use with a controller adapted to receive peak input signals, a method of operation thereof and a power supply employing the circuit or the method.

BACKGROUND OF THE INVENTION

Power supplies and especially power converters are an important and rapidly expanding technology that impacts a broad range of applications including computer systems and telecommunication environments. A power converter is a power processing circuit that converts an input voltage waveform into a specified output voltage waveform. In many applications requiring a stable and well-regulated output, switched-mode power converters are frequently employed to advantage. A typical power converter operating in a switched-mode fashion may include an EMI filter, an inverter, a transformer having a primary winding coupled to the inverter, an output circuit coupled to a secondary winding of the transformer, an output filter and a controller. The inverter generally includes a power switch, such as a field-effect transistor (FET), that converts an input voltage to a switched voltage that is applied across the transformer. The transformer generally transforms the voltage to another value. The output circuit generates a desired voltage at the output of the converter and typically includes an output capacitor that smooths and filters the output voltage for delivery to a load.

Power converters must sometimes accommodate severe transient conditions and operate within a specific range of input voltages. During a start-up mode, a transient condition of particular interest occurs at the time that an input voltage is first applied to a power converter. If an AC power source is applied at a time near its peak voltage, a large inrush current transient may cause damage to components of the power converter. This condition may be avoided by the use of an inrush limiting resistance that limits the maximum value of the inrush current transient to an acceptable level. The inrush resistance, however, must be removed from the circuit during normal operation to preserve the overall efficiency of the power converter. Ideally, the inrush resistance should be placed on the input voltage side of the power converter between the EMI filter and the inverter to protect the power converter from the transient condition and to prevent EMI noise from emitting out into the source of input voltage by bypassing the EMI filter.

The power supply controller typically monitors the input voltage to determine if and when the input voltage has reached a required value both to start and to sustain the operation of the power converter. The ideal position for monitoring the input voltage is between the EMI filter and the inrush resistor. The controller typically monitors the peak value of the AC input voltage to determine when the required value is reached. If the inrush resistance is placed at the input of the power converter, (i.e., before the EMI filter) to maximize component protection, the peak of the AC input voltage waveform may be sufficiently distorted or reduced on the output side of the inrush resistance to cause the controller to misinterpret the magnitude of the AC input voltage. Such a misinterpretation may cause the power converter either not to start or to sustain its operation.

Accordingly, what is needed in the art is a system and method employable with a peak-mode controller to accommodate average signals thereby overcoming the deficiencies of the prior art, such as those described above.

SUMMARY OF THE INVENTION

To address the above-discussed deficiencies of the prior art, the present invention provides, for use with a controller adapted to receive a signal representing a peak input signal a conditioning circuit, a method of operation thereof and a power supply employing the circuit or the method. In one embodiment, the conditioning circuit includes: (1) a comparator circuit that compares an average input signal to a reference signal and develops therefrom a comparison signal representing the average input signal, and (2) a switching circuit, coupled to the comparator circuit, that transforms the comparison signal into a format employable by the controller.

The present invention, in one aspect, introduces the broad concept of conditioning and transforming a signal format dictated by one type of circuit with system constraints into a signal format adapted for the operation of another type of circuit, such as a controller. This transformation allows the controller to remain largely unchanged, which is highly advantageous. Often, a controller that is microprocessor-based finds extensive use in a variety of applications. Over time, the extensive use of the controller generates a high level of confidence that the controller is reliable and therefore creates a reluctance toward making modifications to the controller. Additionally, such modifications may be costly, especially in the area of testing wherein some level of reliability must again be at least initially established. The present invention recognizes the advantages associated with such controllers and provides a circuit that allows the controller to be applied for other purposes or in different environments.

In one embodiment of the present invention, the comparison signal assumes a first level when the average input signal is below the reference signal. Additionally, the comparison signal assumes a second level when the average input signal is above the reference signal. The first level may represent a logical "zero" or false response for the comparison of the two inputs to the comparator circuit. The second level may then represent a logical "one" or true response. The average input signal being below or above the reference signal could be representative of a condition wherein the amplitude of the AC power signal is below or above a threshold value that determines whether the power supply should be operational. Of course, the meaning of these two levels may be reversed as an application dictates.

In one embodiment of the present invention, the comparison signal switches between the first and second levels as a function of the comparison signal and the switching circuit. This characteristic allows the comparison signal to be synchronized to the timing and polarity needs of the controller.

In one embodiment of the present invention, the switching circuit transforms the comparison signal by intermittently grounding the average input signal. By grounding the average input signal, the switching circuit may thus develop a signal employable by the controller.

In one embodiment of the present invention, the switching circuit employs a zero crossing signal. A zero crossing signal may be used for timing purposes to synchronize the comparison signal. Often the zero crossing signal is correlated with the zero crossings of an AC power waveform. However, another waveform having periodic or aperiodic intervals may also be used as an application may dictate.

In one embodiment of the present invention, the switching circuit comprises an error amplifier and a switch. The error amplifier and the switch work in concert to establish the timing with respect to the needs of a particular controller. The error amplifier allows a timing signal to be referenced to another signal to more precisely control the operation of the switch. Of course, other types of circuits may be employed in the switching circuit and still well within the broad scope of the present invention.

In one embodiment of the present invention, the switching circuit comprises at least one semiconductor device. The semiconductor device may be a transistor, such as a metal oxide semiconductor (MOS) field effect transistor. In an alternate embodiment, the semiconductor device may be a bipolar transistor or a diode. Of course, the switching circuit is not limited to any particular device.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
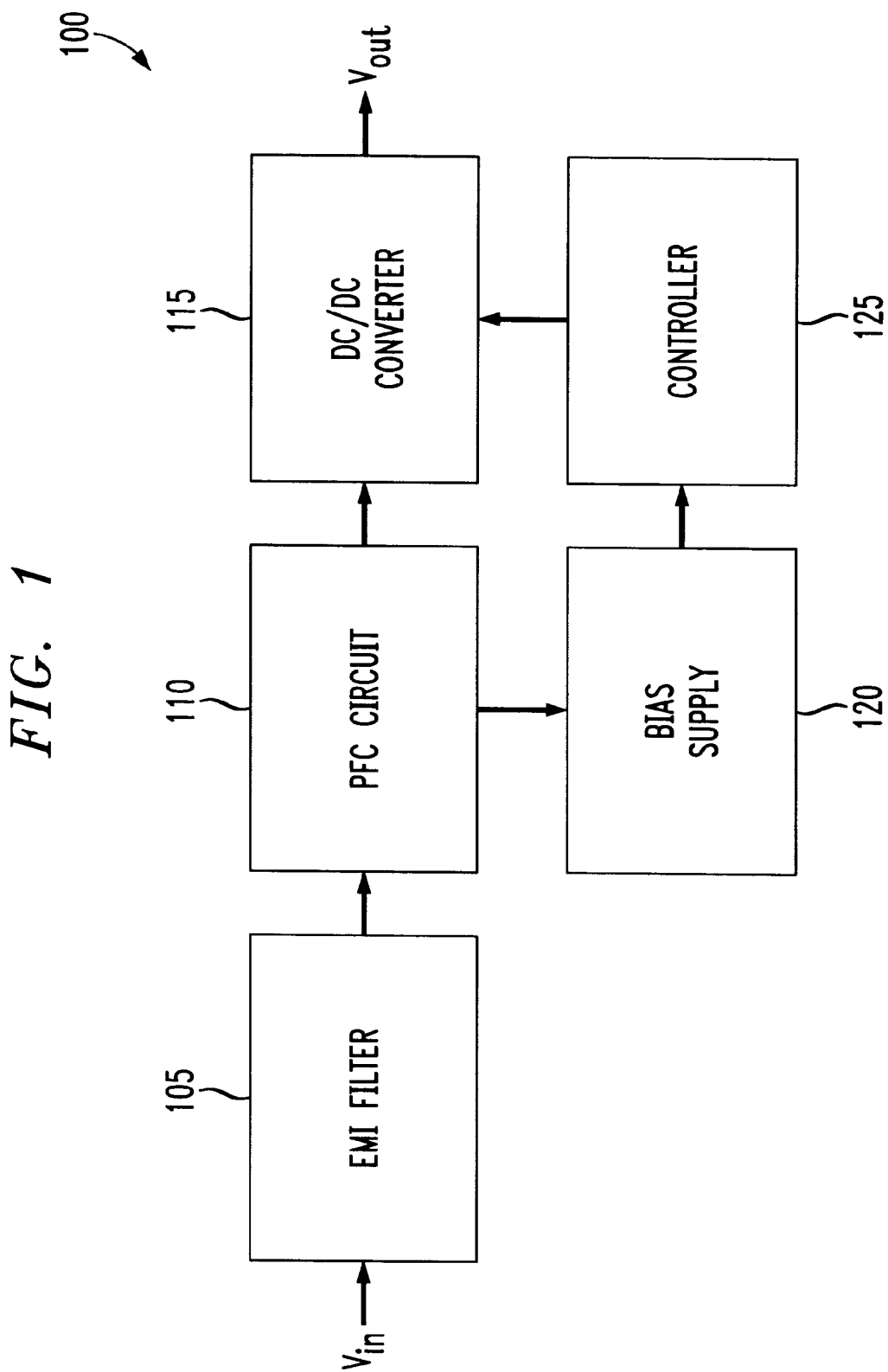
FIG. 1 illustrates a block diagram of an embodiment of a power supply constructed according to the principles of the present invention.

Referring initially to FIG. 1, illustrated is a block diagram of an embodiment of a power supply 100 constructed according to the principles of the present invention. The power supply 100, with an input voltage Vin and an output voltage Vout, includes an electromagnetic interference (EMI) filter 105, a power factor correction (PFC) circuit 110, a DC/DC converter 115, a bias supply 120 and the controller 125. The EMI filter 105 is coupled to the input voltage Vin, which is a source of AC voltage in this embodiment. The PFC circuit 110, coupled to the EMI filter 105, provides an improved power factor for the power supply 100. The DC/DC converter 115, coupled to the PFC circuit 110, provides DC output power at the output of the power supply 100. The bias supply 120, coupled to the PFC circuit 110, provides start-up power for components of the power supply 100.

The controller 125, coupled to the bias supply 120 and the DC/DC converter 115, is adapted to receive a signal representing a peak input AC signal. In the illustrated embodiment, the controller 125 receives power from the bias supply 120 and is adapted to drive the power switches of the DC/DC converter 115 to regulate the output voltage Vout. The controller 125 is adapted to receive a signal representing a peak input signal. Because the signal representing the peak input signal may not be available or may be distorted, the present controller 125 advantageously includes a conditioning circuit that transforms an average input signal into a format employable by the controller 125. In the illustrated embodiment, the conditioning circuit has a comparator circuit and a switching circuit. The conditioning circuit will be further described in FIG. 2. In an alternate embodiment, the controller 125 may be included in the PFC circuit 110.

In the illustrated embodiment, the EMI filter 105 includes an inrush resistor used to limit an inrush current that typically occurs at the moment when the input voltage Vin is applied to the power supply 100. The EMI filter 105 also includes an input filter capacitor. The EMI filter 105 further includes a relay, coupled across the inrush resistor, that removes the inrush resistor when both the inrush current has subsided and the input voltage Vin is within a predetermined operating range. In a start-up mode of operation of the power supply 100, an AC power source representing the input voltage Vin is applied to the EMI filter 105. A resulting inrush-limited current then charges the input filter capacitor of the EMI filter 105.

When the voltage across the filter capacitor reaches a specific level (approximately 100 volts for this embodiment), the bias supply 120 starts to power up the DC/DC converter 115 as directed by the controller 125. When the controller 125 determines that the input voltage Vin is within the predetermined operating range for the power supply 100, the start-up mode of operation changes to a normal mode of operation. The normal mode of operation continues as long as the controller 125 senses that the input voltage Vin is within the predetermined operating range.

Figure 2:
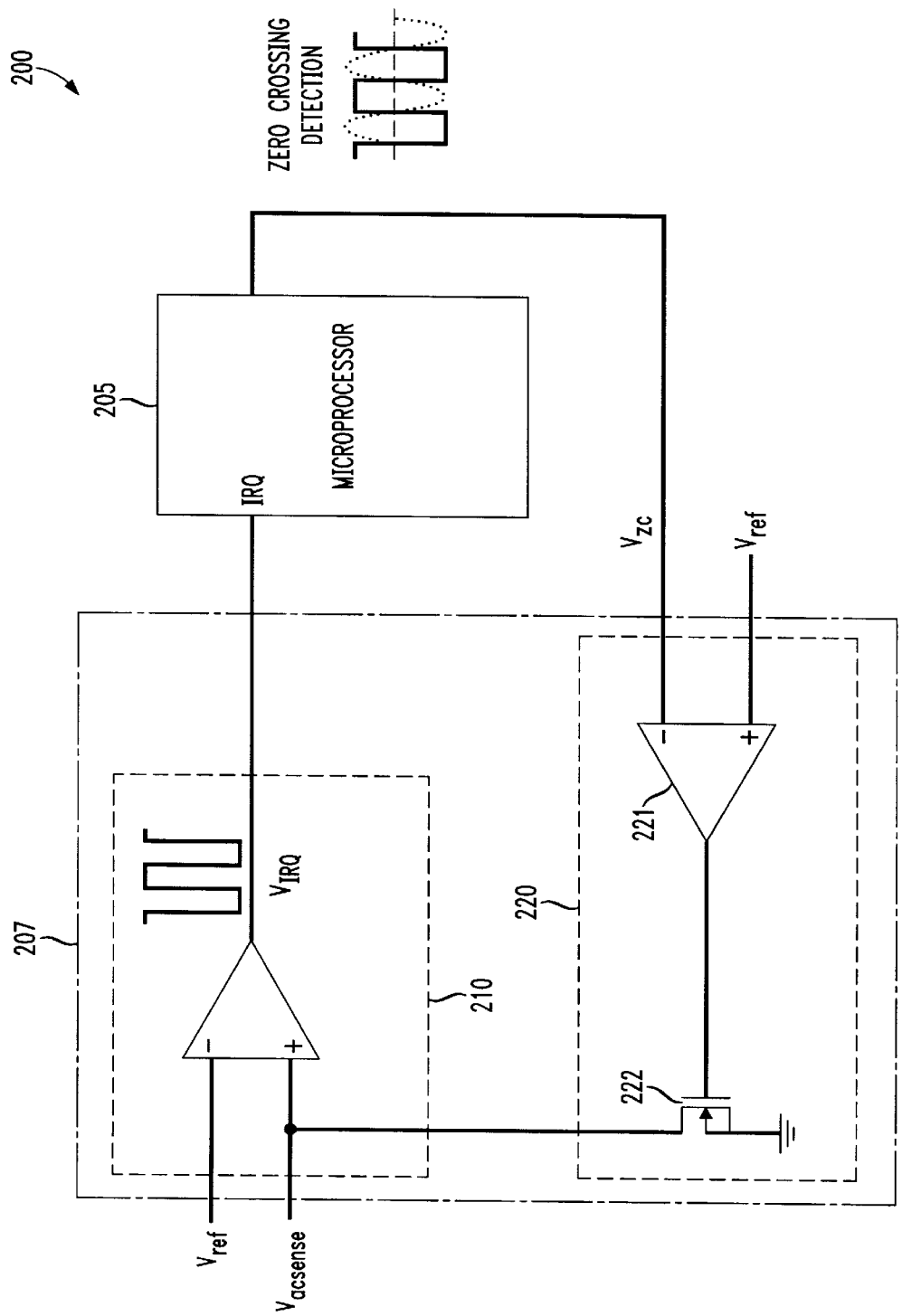
FIG. 2 illustrates a block diagram of an embodiment of a controller constructed according to the principles of the present invention.

Turning now to FIG. 2, illustrated is a block diagram of an embodiment of a controller 200 constructed according to the principles of the present invention. The controller 200 may be employed as the controller 125 illustrated and described with respect to the power supply 100 of FIG. 1 and includes a microprocessor 205 and a conditioning circuit 207. The conditioning circuit 207 includes a comparator circuit 210 and a switching circuit 220. The comparator circuit 210 is adapted to compare an average input signal Vacsense to a reference signal Vref and develop therefrom a comparison signal $V_{IRQ}$ representing the average input signal Vacsense. The switching circuit 220, coupled to the comparator circuit 210, transforms the comparison signal $V_{IRQ}$ into a format employable by the microprocessor 205.

In the illustrated embodiment, the microprocessor 205 is adapted to receive a signal representing a peak input signal having specific timing requirements. Since the peak input signal may not be available due to circuit elements that may interfere with the peak input signal, the controller 200 may employ the average input signal Vacsense in place of the peak input signal to correctly determine the presence of a predetermined operating range of the input voltage Vin.

The conditioning circuit 207 conditions and transforms an average input signal into a signal format required for the proper operation of the microprocessor 205. This transformation allows the microprocessor 205 (and its microcode) of the controller 200 to remain largely unchanged, which is highly advantageous. The microprocessor 205 may form a basic element in a variety of different control environments. The extensive use of the microprocessor 205 over time generates a high level of confidence that it is reliable and therefore creates a reluctance toward modifying it. Additionally, such modifications may be costly, especially in the area of testing wherein some level of reliability must again be at least initially established.

In the illustrated embodiment, the comparator circuit 210 creates the comparison signal V$_{IRQ}$ based on a relationship between the reference signal Vref and the average input signal Vacsense. The comparison signal V$_{IRQ}$ assumes a first level when the average input signal Vacsense is below the reference signal Vref. Alternately, the comparison signal V$_{IRQ}$ assumes a second level when the average input signal Vacsense is above the reference signal Vref. In the illustrated embodiment, the first level may represent a logical "zero" or false response from the comparator circuit 210 for the comparison of the two inputs while the second level may represent a logical "one" or true response. The average input signal Vacsense being below or above the reference signal Vref may represent a condition wherein the amplitude of the AC power signal is below or above a threshold value that determines whether the power supply 100 should be operational. Of course, the meaning of these two levels may be reversed as an application or another embodiment dictates.

The switching circuit 220 comprises an error amplifier 221 and a switch 222, in the present embodiment. The error amplifier 221 and the switch 222 work in concert to establish the timing required by the microprocessor 205. The error amplifier 221 allows a timing signal to be referenced to another signal (e.g., the reference signal Vref) to control the operation of the switch 222. In the illustrated embodiment, the switch 222 is a semiconductor device in the form of a metal oxide semiconductor (MOS) field effect transistor.

The timing signal employed may be a zero crossing signal Vzc generated by the microprocessor 205 that represents the zero crossings of the AC power source supplied as the input voltage Vin. The zero crossing signal Vzc synchronizes the operation of the switching circuit 220 according to the requirements of the microprocessor 205. Of course, another waveform having periodic or aperiodic intervals, other types of circuits including error amplifiers or another semiconductor switching device such as a bipolar transistor or a diode may also be used as another application or embodiment may dictate.

The switch 222 closes or opens, as driven by the error amplifier 221, thereby intermittently grounding the input of the comparator circuit 210 containing the average input signal Vacsense. Closing the switch 222 performs a logical "AND" between the zero crossing signal Vzc and the comparison signal V$_{IRQ}$. This action causes the comparison signal V$_{IRQ}$ to switch from the second level to the first level when the average input signal Vacsense is greater than the reference signal Vref as shown in FIG. 2. This switching of the comparison signal V$_{IRQ}$ meets the existing synchronization needs of the controller 200 and indicates that the input voltage vin is within the predetermined operating range required by the power supply 100. Alternately, the comparison signal V$_{IRQ}$ remains at the first level when the switch 222 closes indicating that the average input signal Vacsense is below the reference signal Vref and that the input voltage Vin is not within the predetermined operating range.

For a better understanding of power supplies and control circuits, see Modern DC-to-DC Switchmode Power Converter Circuits, by Rudolph P. Severns and Gordon Bloom, Van Nostrand Reinhold Company, New York, New York (1985) and Principles of Solid-State Power conversion, by Ralph E. Tarter, Howard W. Sam & Co., Inc., Indianapolis, Ind. (1985), which are incorporated herein by reference in their entirety. Although the present invention has been described in detail, those skilled in the art should understand that they can make various changes, substitutions and alterations herein without departing from the spirit and scope of the invention in its broadest form.

What is claimed is:

1. For use with a controller adapted to receive a signal representing a peak input signal, a conditioning circuit, comprising:
    a comparator circuit that compares an average input signal to a reference signal and develops therefrom a comparison signal representing said average input signal; and
    a switching circuit, coupled to said comparator circuit, that transforms said comparison signal into a format employable by said controller.

2. The conditioning circuit as recited in claim 1 wherein said comparison signal assumes a first level when said average input signal is below said reference signal and a second level when said average input signal is above said reference signal.

3. The conditioning circuit as recited in claim 1 wherein said comparison signal switches between first and second levels as a function of said comparison signal and an operation of said switching circuit.

4. The conditioning circuit as recited in claim 1 wherein said switching circuit transforms said comparison signal by intermittently grounding said average input signal.

5. The conditioning circuit as recited in claim 1 wherein said switching circuit employs a zero crossing signal.

6. The conditioning circuit as recited in claim 1 wherein said switching circuit comprises an error amplifier and a switch.

7. The conditioning circuit as recited in claim 1 wherein said switching circuit comprises at least one semiconductor device.

8. A method of conditioning an average input signal for use with a controller adapted to receive a signal representing a peak input signal, comprising:
    comparing an average input signal to a reference signal;
    developing a comparison signal that represents said average input signal; and
    transforming said comparison signal into a format employable by said controller.

9. The method as recited in claim 8 wherein said developing comprises said comparison signal assuming a first level when said average input signal is below said reference signal and a second level when said average input signal is above said reference signal.

10. The method as recited in claim 8 wherein said transforming is performed by a switching circuit.

11. The method as recited in claim 10 wherein said transforming comprises switching said comparison signal between first and second levels as a function of said comparison signal and an operation of said switching circuit.

12. The method as recited in claim 10 wherein said switching circuit transforms said comparison signal by intermittently grounding said average input signal.

13. The method as recited in claim 10 wherein said switching circuit employs a zero crossing signal in transforming said comparison signal.

14. The method as recited in claim 10 wherein said switching circuit comprises an error amplifier and a switch.

15. A power supply having an input and output, comprising:
    an electromagnetic interference (EMI) filter coupled to said input;
    a power factor correction (PFC) circuit, coupled to said EMI filter, that provides an improved power factor for said power supply;

a bias supply, coupled to said PFC circuit, that provides start-up power for components of said power supply;

a DC/DC converter, coupled to said PFC circuit, that provides DC power at said output of said power supply; and a controller, coupled to said bias supply and said DC/DC converter, adapted to receive a signal representing a peak input signal to control an operation of said power supply and having a conditioning circuit, including:

a comparator circuit adapted to compare an average input signal to a reference signal and develop therefrom a comparison signal representing said average input signal, and a switching circuit, coupled to said comparator circuit, adapted to transform said comparison signal into a format employable by said controller.

16. The power supply as recited in claim 15 wherein said comparison signal assumes a first level when said average input signal is below said reference signal and a second level when said average input signal is above said reference signal.

17. The power supply as recited in claim 15 wherein said comparison signal switches between first and second levels as a function of said comparison signal and an operation of said switching circuit.

18. The power supply as recited in claim 15 wherein said switching circuit transforms said comparison signal by intermittently grounding said average input signal.

19. The power supply as recited in claim 15 wherein said switching circuit employs a zero crossing signal.

20. The power supply as recited in claim 15 wherein said switching circuit comprises an error amplifier and a switch.

21. The power supply as recited in claim 15 wherein said switching circuit comprises at least one semiconductor device.

* * * * *